United States Patent [19]

Nakayama et al.

[11] Patent Number: 5,461,443
[45] Date of Patent: Oct. 24, 1995

[54] LENS BARREL

[75] Inventors: Haruki Nakayama; Yoshiyuki Nojima, both of Hachioji, Japan

[73] Assignee: Konica Corporation, Japan

[21] Appl. No.: 233,364

[22] Filed: Apr. 25, 1994

[30] Foreign Application Priority Data

Apr. 30, 1993 [JP] Japan ................... 5-023037 U

[51] Int. Cl.⁶ .................................... G03B 1/18
[52] U.S. Cl. .................. 354/195.1; 354/286; 359/823; 359/826
[58] Field of Search ................ 354/195.1, 286; 359/823, 826

[56] References Cited

U.S. PATENT DOCUMENTS

| | | | |
|---|---|---|---|
| 5,051,764 | 9/1991 | Nomura | 354/195.1 |
| 5,079,577 | 1/1992 | Nomura | 354/286 |
| 5,371,569 | 12/1994 | Tanaka | 354/286 |
| 5,381,272 | 1/1995 | Kato et al. | 359/823 |

*Primary Examiner*—Monroe H. Hayes
*Attorney, Agent, or Firm*—Jordan B. Bierman; Bierman and Muserlian

[57] ABSTRACT

In a lens barrel for use in a camera, the inner wall of a fixed barrel and the outer wall of a rotatable barrel are shaped in a first helicoid engagement and the inner wall of the rotatable barrel and the outer wall of a lens holding-barrel are shaped in a second helicoid engagement, wherein a pitch of the second helicoid engagement is substantially equal to that of the first helicoid engagement. One end of a flexible print circuit is connected with an electrical device on the lens holding-barrel, the middle portion of it is extended backward between the outer wall of the lens holding-barrel and the inner wall of the rotatable barrel and is turned around the back end of the rotatable barrel so as to be further extended forward between the outer wall of the rotatable barrel and the inner wall of the fixed barrel, and the other end of it is passed a through hole provided on the fixed barrel and is extended to the camera body.

4 Claims, 4 Drawing Sheets

LENS BARREL

BACKGROUND OF THE INVENTION

The present invention relates to a lens barrel, in which a flexible printed circuit board is provided, and more precisely to a lens barrel in which an FPC (Flexible Print Circuit) is provided, wherein the lens barrel is structured in the manner that a fixed barrel, a moving barrel and a lens frame are mutually engaged with each other.

In many cases, it is necessary to electrically connect the lens barrel to a camera body, accompanied with automation of the camera. For example, this is necessary for an electronic shutter driving circuit, a focal point adjustment circuit for AF, a focal distance switching driving circuit, and the like. In these cases, since the lens barrel moves in the direction of the optical axis, a flexible printed circuit board, that is, FPC is used so that electrical parts of a moving lens barrel side are connected with electrical parts of a fixed main body side.

As an example of the foregoing, there has been disclosed Japanese Utility Model Publication No. 36154/1992, in which: an FPC 101 as shown in FIG. 4 is used; the FPC 101 is connected to a fixed barrel at one end 101a of the FPC 101; the FPC 101 is bent back on itself at a bending portion 101b of the FPC 101; and the FPC 101 is connected to a moving barrel at the other end 101c of the FPC 101. Accordingly, when the moving barrel moves in the direction of the optical axis, the position of the bending portion 101b also moves.

SUMMARY OF THE INVENTION

However, since the bending portion 101b in FIG. 4 is not restricted when it moves, the bending portion 101b is swung upwardly and downwardly by the internal stress of the FPC board itself, or the bending portion 101b is distorted in some cases. Accordingly, sometimes, a flux of light beam is intercepted, or the FPC 101 is worn due to rubbing by other parts, which are problems. Even when it is attempted that a member, by which the bending portion is restricted, is provided in the moving barrel in order to solve these problems, since the moving speed of the moving barrel is twice the moving speed of the bending portion 101b, in practice, the member to restrict the bending portion 101b can not be provided. The object of the present invention is to solve the problems easily, without providing any specific part.

The objects of the present invention can be accomplished by a lens barrel comprising: a fixed barrel which is fixed to a camera main body; a moving barrel which is helicoidally engaged with the fixed barrel in the inner periphery of the fixed barrel; a lens frame which is helicoidally engaged with the moving barrel in the inner periphery of the moving barrel, and which holds at least one group of photographic lenses and a first electrical part; and a guide member having a guide portion by which rotation of the lens frame is prevented, and the lens frame is linearly guided in the direction of the optical axis, the lens frame being linearly moved in the direction of the optical axis by the rotation of the moving barrel, wherein the length of a lead of the helicoid, in which the fixed barrel is engaged with the moving barrel, is set to be the same as that of the helicoid in which the moving barrel is engaged with the lens frame, a flexible printed circuit board passes through a gap formed between the guide portion of the guide member and the inner periphery of the moving barrel in the direction of the rear of the camera after the flexible printed circuit board has been connected to the first electrical part, the flexible printed circuit board is bent at a back end of the moving barrel, and passes through a gap formed between the outer periphery of the moving barrel and the fixed barrel in the direction of the front of the camera, the flexible printed circuit board is pulled out from a hole of the fixed barrel provided at the front of the camera at the back end of the moving barrel to the outer periphery of the fixed barrel when the moving barrel moves toward the front of the camera to its maximum, and the flexible printed circuit board is connected to a second electrical part arranged in the camera body.

DETAILED DESCRIPTION OF THE PREFERRED EMBODIMENT

Figure 1:
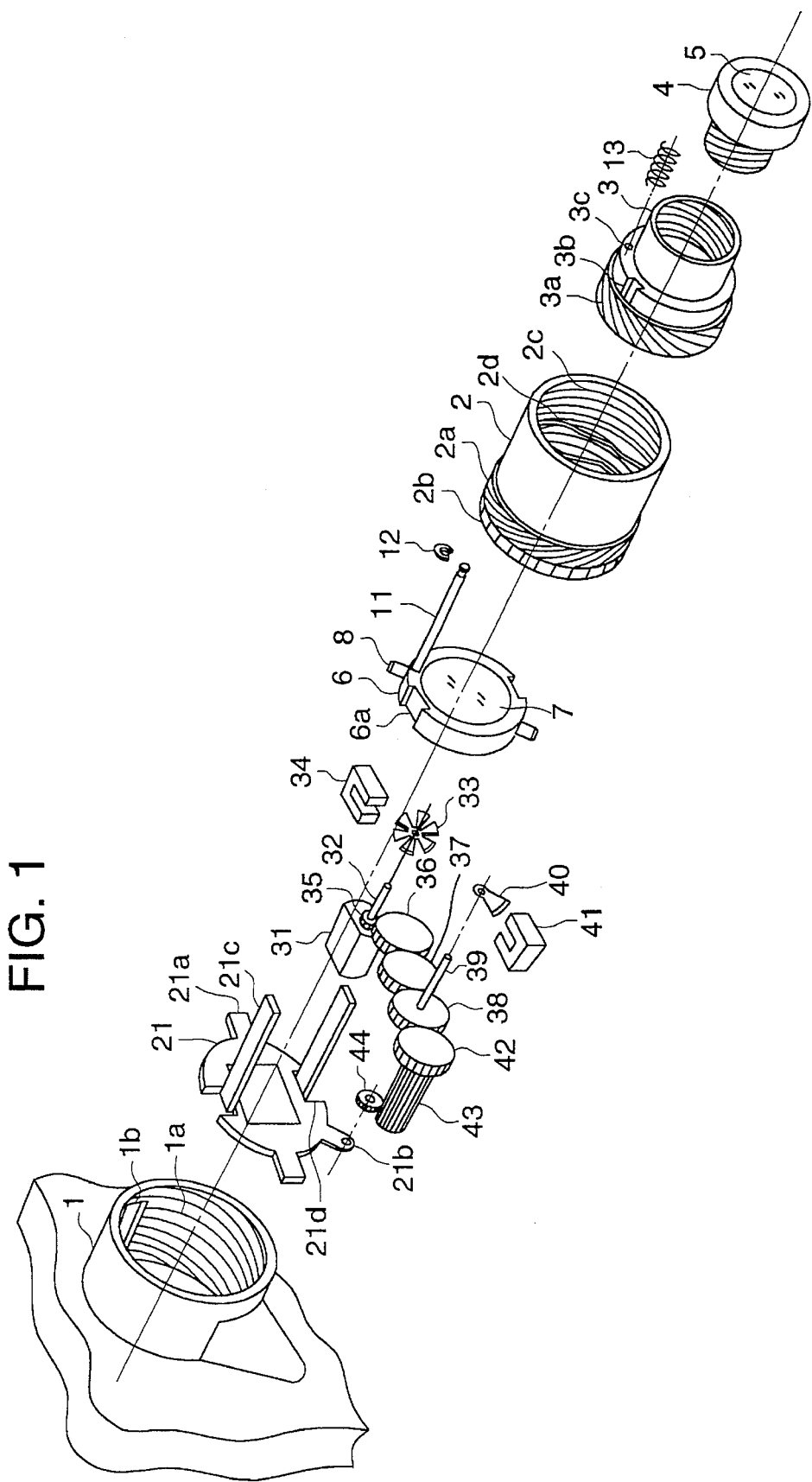
FIG. 1 is an exploded perspective view of a zoom lens barrel.
Figure 2:
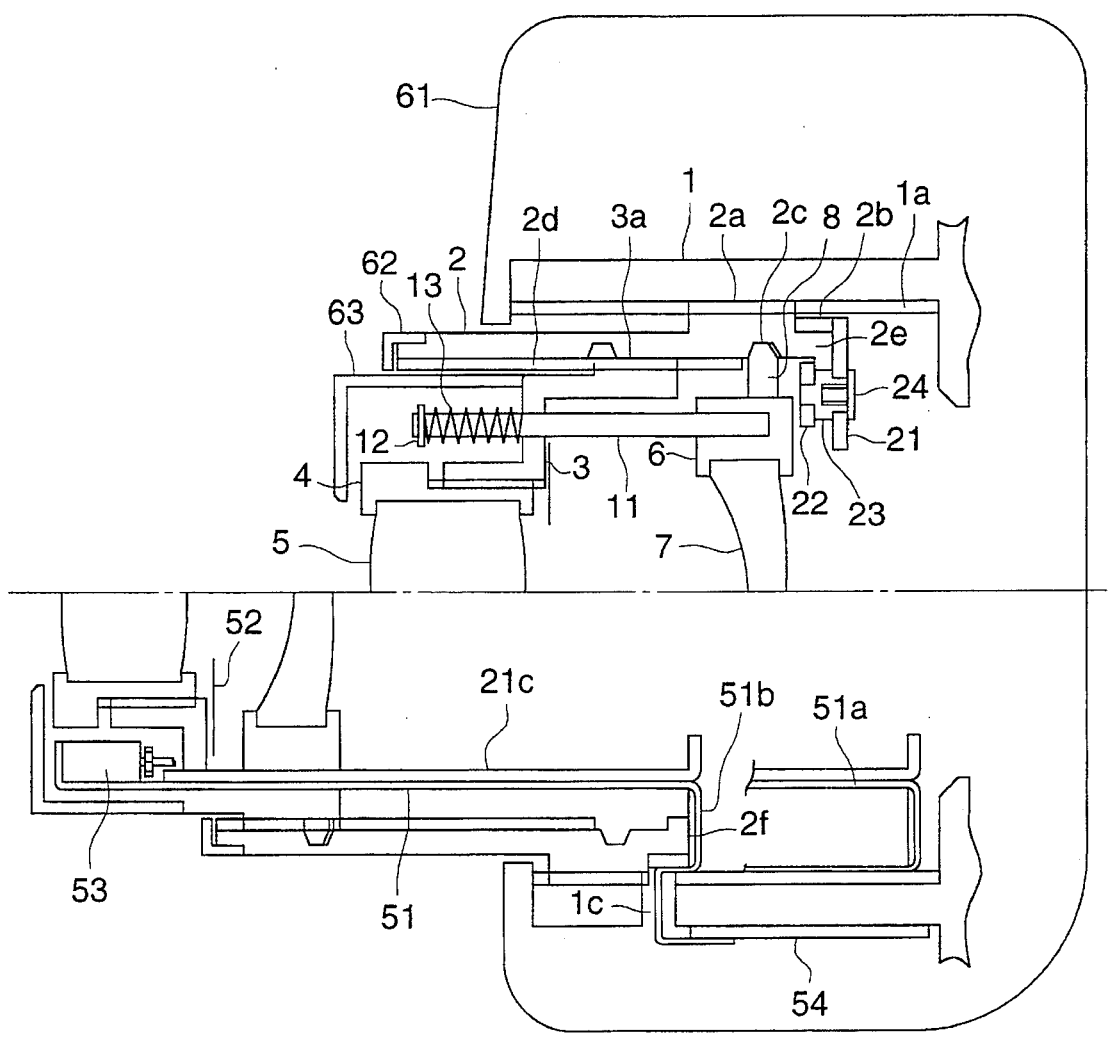
FIG. 2 is cross sectional view of the zoom lens barrel.

Referring to FIGS. 1 and 2, an example of the present invention will be described in detail. FIG. 1 is an exploded perspective view of the zoom lens barrel according to the present invention. FIG. 2 is a cross sectional view of the zoom lens barrel. In FIG. 2, the focal distance is set in the wide angle range in the upper half of the zoom lens barrel, and the focal distance is set in the telescopic angle range in the lower half of the zoom lens barrel.

Numeral 1 is a fixed barrel which is integrally fixed to the camera body, and a female helicoid 1a is provided on the inner periphery of the fixed barrel. Guide slots 1b for a straight guide 21, which will be described later, are provided across the female helicoid 1a at the left and right portions of the female helicoid 1a. Numeral 2 is a moving barrel. A male helicoid 2a, which is screwed on the female helicoid 1a, is integrally formed with a large gear 2b on the outer periphery of the moving barrel. Further, a female helicoid 2c and a cam groove 2d (inner cam) are provided on the inner periphery of the moving barrel 2, and a rib 2e is provided at the back edge portion in the moving barrel in the direction toward the inside of the camera. In the case where the moving barrel 2 is integrally molded with the large gear 2b, when the large gear 2b is positioned on the back end surface of the moving barrel 2, molding can be carried out by a single-unit type mold in the direction of travel, without splitting the forming mold, so that highly accurate parts can be produced by a simple structured mold. Numeral 3 is an FC sliding frame, and an FC lens frame 4, holding an FC lens 5, in which the synthetic focal distance is (+), is fixed to the FC sliding frame from the front with screws. A male helicoid 3a, which is screwed on the female helicoid 2c, and a guide slot 3b for the straight guide 21, which will be described later, are provided on the outer periphery of the FC sliding frame 3, and a hole 3c for a guide shaft 11, which will be described later, is also provided thereon. Numeral 6 is an RC sliding frame, which holds an RC lens 7 by the inner periphery of the sliding frame. The synthetic focal distance of the RC lens 7 is (−). On the outer periphery of the sliding frame, a guide slot 6a for the straight guide 21 is provided, and an RC cam pin 8, which is engaged with the cam groove 2d, is also provided. A guide shaft 11 protrudes from the outer periphery of the sliding frame 6. Numeral 13 is a shaft spring which is inserted into the guide shaft 11. Numeral 12 is an E-ring to prevent a shaft spring 13 from coming off the shaft. Numeral 21 is a straight guide, protrusions 21a of which slide in the guide slots 1b of the fixed barrel 1. Protrusions 21a protrude from the left and right sides of the straight guide 21. A driving gear 44, which will be described later, is rotatably supported by another protrusion 21b. Arm portions 21c, which are bent in the forward direction, slide in guide slots 3b and guide slots 6a. Numeral 22 is a guiding fixed-plate, by which the moving barrel 2 is connected to the straight guide 21. Numeral 23 is a guiding fixed-shaft which is caulked to the guiding fixed-plate. Numeral 24 is a set screw by which the straight guide 21 is fixed to the guiding fixed-shaft 23. Although the moving barrel 2 is surrounded by the straight guide 21, the guiding fixed-plate 22 and the guiding fixed-shaft 23, the moving barrel 2 is rotatable on the straight guide unit 21. Numeral 31 is a barrel driving motor. A propeller 33 for LDP1 is mounted on a shaft 32 of the motor. The propeller 33 is used for generating a signal LDP1 by a photointerrupter 34 for LDP1. Numeral 35 is a pinion which is directly connected to the motor. The rotation of the motor 31 is transmitted to the fifth gear 43, the shape of which is long in the direction of the optical axis, through the first gear 36, the second gear 37, the third gear 38 and the fourth gear 42, and further transmitted to a driving gear 44. The driving gear 44 is engaged with the large gear 2b of the moving barrel 2. A propeller 40 for LDP2 is mounted on a shaft 39 of the third gear 38, and generates a signal LDP2 by a photointerrupter 41 for LDP2. The signals LDP1 and LDP2 are signals for controlling the barrel driving motor.

Numeral 52 is a shutter, and numeral 53 is a shutter driving motor, which are mounted on the FC sliding frame 3. Numeral 51 is an FPC board, through which the shutter driving motor 53 is connected to a printed circuit board 54 on which electrical components of the main body are mounted. After the FPC board 51 is connected to the shutter driving motor 53, the FPC board 51 passes through a gap formed between the arm portion 21c of the straight guide 21 and the inner periphery of the moving barrel 2 in the backward direction of the camera. Then, the direction of the advance of the FPC board 51 is changed to the forward direction of the camera at the back end 2f of the moving barrel 2, and the FPC board 51 passes through a gap formed between the outer periphery of the moving barrel 2 and the fixed barrel 1. A hole 1c is provided in the fixed barrel 1 in the front direction of the camera at the back end 2f of the moving barrel 2, at which the moving barrel 2 is protruded to the maximum. The FPC board 51 passes through the hole 1c, and is withdrawn on the outer periphery of the fixed barrel 1. The FPC barrel 51 is connected to the printed circuit board 54 of the main body. In this context, numeral 51a shows the FPC board 51 at the position in which the lens barrel is most collapsed. Numeral 61 is the outer shape of the camera. A decorative ring 62 is mounted on the moving barrel 2, and a front barrel 63 is mounted on the FC sliding frame 3.

Next, basic operations of the zoom lens barrel will be described.

Initially, when the driving motor 31 is rotated, the driving force of the motor is transmitted through a gear train 36, 37, 38, and 42 to the fifth gear 43. The driving force is transmitted through the fifth gear 43 to the a driving gear 44 which is mounted on the straight guide 21. The driving gear 44 is engaged with the large gear 2b, and rotates the moving barrel 2. The driving gear 44 moves the moving barrel 2, which is helicoidally engaged with the fixed barrel 1, in the direction of the optical axis. At this time, the moving barrel 2 moves forward or backward in the direction of the optical axis depending on the rotational direction of the driving motor 31. The straight guide 21 is integrally provided with the rib 2e of the moving barrel 2 by the guiding fixed-plate 22, the guiding fixed-shaft 23, and the screw 24. The rotation of the straight guide 21 is interrupted by the left and right protrusions 21a and the guide slot 1b of the fixed barrel 1. The straight guide 21 only moves in the direction of the optical axis. In the same way as the foregoing, the rotation of the FC sliding frame 3 is interrupted at the guide slot 3b by the straight guide 21. Further, since the guide shaft 11 protrudes from the RC sliding frame 6 passes through the FC sliding frame 3, the rotation of both the RC sliding frame 6 and the FC sliding frame 3 are interrupted. Accordingly, when the moving barrel 2 is rotated and moved, the FC sliding frame 3, which is helicoidally connected to the moving barrel 2, and the RC sliding frame 6, which is cam-connected to the moving barrel 2, are only moved forward or backward in the direction of the optical axis.

Since the lead of the helicoid, in which the fixed barrel 1 is engaged with the moving barrel 2, and the lead of the helicoid, in which the moving barrel 2 is engaged with the lens frame 4, are set to be approximately the same, the FC sliding frame 3 moves at a ratio of approximately 2 times the speed at which the moving barrel 2 moves. The connected portion, at which the FPC board 51 is connected to a shutter driving motor 53, moves at a ratio of 2 times the speed at which a bending portion 51b of the FPC board 51 moves. Accordingly, a back end portion 2f of the moving barrel 2 and the bending portion 51b of the FPC board 51 move at approximately the same speed, and approach each other. Therefore, even when the bending portion 51b of the FPC board 51 is oscillated due to internal stress of the FPC board 51, or the like, the bending portion 51b is always restricted by the back end portion 2e of the moving barrel 2. Further, left and right movement of the bending portion 51b of the FPC board 51 is restricted by a cut-out portion 21d of the straight guide 21 in FIG. 1, and therefore, the FPC board 51 is more stably held.

The engaged position of the fifth gear 43 with the driving gear 44 is changed in the direction of the optical axis accompanied with the movement of the moving barrel 2. However, since the fifth gear 43 is an elongated gear in which long teeth are provided in the direction of the optical axis, the engagement of the gears is always maintained, in spite of the movement of the moving barrel 2. The rib 2e of the moving barrel 2 is provided to prevent the straight guide 21 from being disengaged from this assembly. The inner surface of the rib 2e forms a bearing surface by which the rotation of the moving barrel is supported, and prevents the moving barrel 2 from being deformed at the time of driving force transmission.

The RC sliding frame 6 holding the RC lens 7, is driven by the cam groove 2d as described above, and the shape of the cam is divided into two regions, a focusing region and a focal distance switching region, so that the focusing operation and the focal distance switching operation can be carried out by the same driving means.

The guide shaft 11 protruded from the RC sliding frame 6 penetrates the FC sliding frame 3, and the compressed shaft spring 13 is held by the E-ring at the front end of the guide shaft 11. Accordingly, the RC sliding frame 6 is always pulled in the direction of the FC sliding frame 3 by the spring force. Therefore, only one surface of the cam of the cam groove 2d of the moving barrel 2 is used. Accordingly, the width of the cam groove is larger than that of the cam pin, and is sufficient for the operation of the cam pin. A rise angle of the cam groove 2d is asymmetrical at a front side and at a rear side in the manner that the rise angel of the cam groove is increased as large as possible at the side to which the force of the shaft spring 13 is applied so that plastic molding of this cam can be easily carried out. When the focusing operation is carried out, the RC sliding frame 6 is moved in the direction in which the spring force applied to the RC sliding frame is increased. When the zooming operation is carried out, the RC sliding frame 6 is moved in the direction in which the spring force applied to the RC sliding frame is decreased. The cam groove 2d is opened in the forward .direction of the optical axis. When the RC sliding frame 6 is assembled into the moving barrel 2, it is assembled from the front of the moving barrel 2. This RC sliding frame 6 is connected to the FC sliding frame 3 (including the shutter 52 and the like) by the guide shaft 11. Accordingly, the FC, and RC sliding frames are assembled into the cam groove in a unit. In this case, when the RC sliding frame 6 is pulled to the FC sliding frame 3 side, the good assembling operability is obtained. Further, when the RC sliding frame 6 is covered by the FC sliding frame 3, flaws of the RC lens group 7 of the RC lens frame 6 can be prevented.

Normally, the lens performance, such as the resolving power for projection, is checked at the inspection step of the moving barrel unit including FC and RC sliding frame unit. However, when the moving barrel provided on the outer surface of the moving barrel unit is rotated, both the focal distance selection and the focus adjustment can be carried out, so that the efficiency of the inspection is very high, and large electric tools are not necessary. When the lens performance, such as the resolving power for projection, is inspected under this condition, defects can be easily detected, and the overhaul/repair time and cost can be greatly reduced. It is not necessary that the shutter driving portion, FPC, and lens cover are assembled in this unit, and further the focusing mechanism need not be assembled in this unit. Accordingly, replacement of a defective FC lens can be easily carried out.

Figure 3:
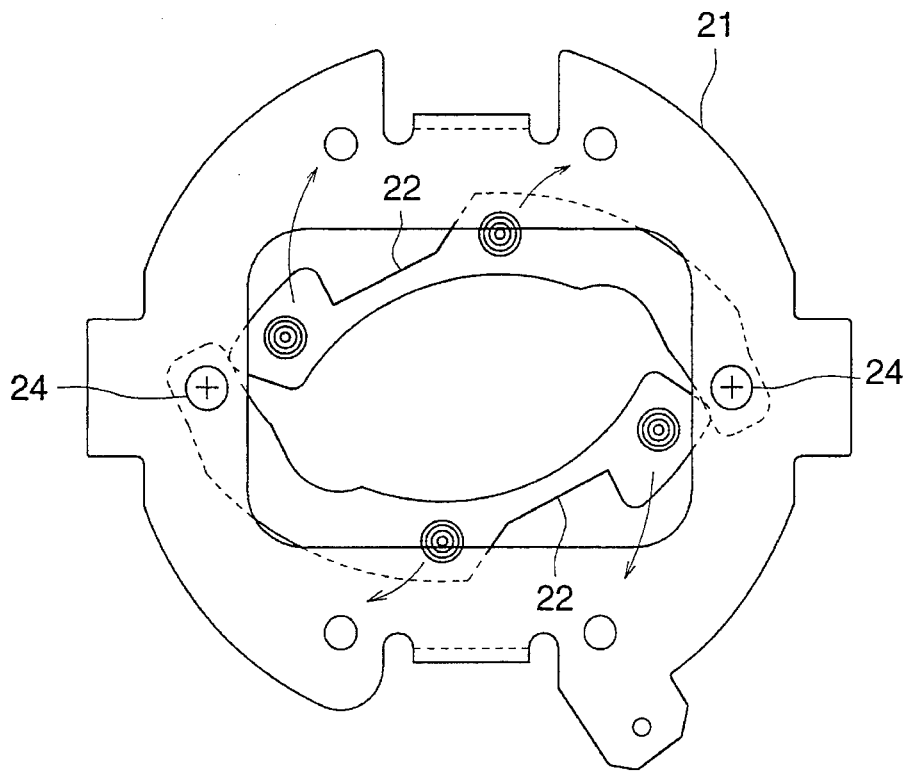
FIG. 3 is an illustration of an assembly of a guiding fixed plate.
Figure 3:
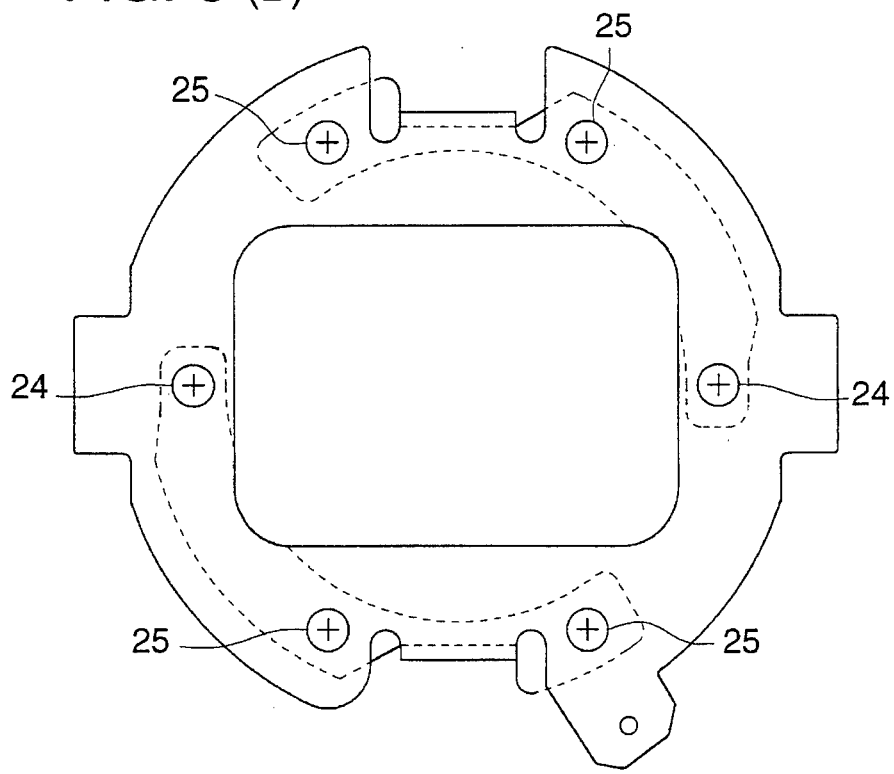
Figure 4:
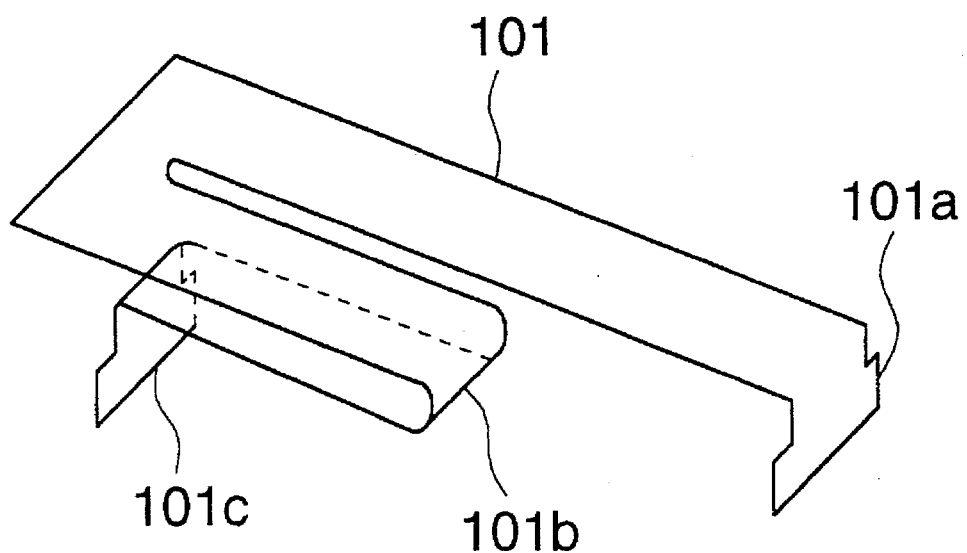
FIG. 4 is a view showing a conventional FPC board.

After the moving barrel unit has been housed in the fixed barrel 1, the straight guide 21 is installed, and the two fixed plates 22 to support the straight guide 21 are installed. These assembling operations are explained below, referring to FIGS. 3(A) and 3(B). In FIG. 3(A), in order to increase the assembling operability, two temporary fixed plates 22 are fixed to the straight guide 21 respectively by screws 24. After the straight guide 21 has been installed in the moving barrel 2 from the back of the camera, the two fixed plates 22 are rotated clockwise around the screws 24, and screwed onto the straight guide 21 at 6 positions by the screws 24 and screws 25, as shown in FIG. 3(B). As described above, the straight guide 21 can linearly guide the fixed barrel 1 and the FC sliding frame 3 by a single part. Accordingly, the FC sliding frame 3 can be very accurately moved linearly, and resulting in high efficiency of the driving force for the linear movement.

The moving barrel 2 is synchronously moved with the straight guide 21 in the direction of the optical axis. A driving gear 44 is mounted on the straight guide 21. Accordingly, even when the moving barrel 2 moves in the direction of the optical axis, the position in the direction of the optical axis with respect to the driving gear is not changed. Therefore, the shape of the large gear 2b provided on the moving barrel 2 is a simple structure so that the width of the teeth of the large gear 2b is limited to a predetermined value, and projects from the back end of the moving barrel. This is done from the reason that the dimension of the large gear in the direction of the optical axis is reduced to be as small as possible.

As described above, according to the present invention, when the bending portion of the FPC board moves, the movement of the bending portion is always restricted. Accordingly, even when the bending portion is oscillated, the bending portion does not intercept the flux of light, and is not rubbed by other parts, so that it does not wear out. Further, other members to restrict the oscillation of the bending portion are not specifically needed, and a member to absorb any dip of the FPC board is not necessary. Further, when the width of the FPC board is set to be the same as that of the arm portion of the straight guide, or to be smaller than that of the arm portion of the straight guide, the irregular reflection from the FPC board due to the incident rays of light does not occur. Accordingly, processing to prevent the reflection of light from the FPC board is not necessary.

What is claimed is:

1. A lens barrel for use in a camera, comprising:
   a fixed barrel provided on a camera body;
   a rotatable barrel inserted in the fixed barrel in such an arrangement that the inner wall of the fixed barrel and the outer wall of the rotatable barrel are shaped in a first helicoid engagement;
   a lens holding-barrel for carrying a lens and a electrical member, the lens holding-barrel inserted in the rotatable barrel in such an arrangement that the inner wall of the rotatable barrel and the outer wall of the lens holding-barrel are shaped in a second helicoid engagement, wherein a pitch of the second helicoid engagement is substantially equal to that of the first helicoid engagement;
   guide member associated with the lens holding-barrel so that the lens holding barrel is moved forward to a subject or backward to the camera body without rotating as the rotatable barrel is rotated;
   a flexible electric circuit member, one end of which is connected with the electrical member on the lens holding-barrel, the middle portion of which is extended backward between the outer wall of the lens holding-barrel and the inner wall of the rotatable barrel and is turned around the back end of the rotatable barrel so as to be further extended forward between the outer wall of the rotatable barrel and the inner wall of the fixed barrel, and the other end of which is passed a through hole provided on the fixed barrel and is extended to the camera body.

2. The lens barrel of claim 1, wherein the guide member comprises a guide groove provided on the inner wall of the fixed barrel and a guide protrusion provided on the lens holding-barrel and wherein the end of the guide protrusion is fit in the guide groove so that the lens holding-barrel is moved along the guide groove.

3. The lens barrel of claim 2, wherein the guide member further comprises guide plate extended between the inner wall of the rotatable barrel and the outer wall of the lens holding barrel, and wherein the middle portion of the the flexible electric circuit is extended along the guide plate.

4. The lens barrel of claim 1, wherein the electrical member on the lens holding-barrel is a shutter driving unit.

\* \* \* \* \*